United States Patent
Pimpinella

[19]

[11] Patent Number: 6,055,343
[45] Date of Patent: Apr. 25, 2000

[54] PRIMARY STAGE OPTICAL SWITCH FOR AN OPTICAL FIBER ADMINISTRATION SYSTEM

[75] Inventor: Richard Joseph Pimpinella, Hampton, N.J.

[73] Assignee: Lucent Technologies Inc., Murray Hill, N.J.

[21] Appl. No.: 08/935,228

[22] Filed: Sep. 22, 1997

[51] Int. Cl.$^7$ .................................................. G02B 6/00
[52] U.S. Cl. ............................ 385/16; 385/135; 385/134
[58] Field of Search .............................. 385/16, 105, 106, 385/110, 135, 134; 356/73, 1

[56] References Cited

U.S. PATENT DOCUMENTS

| | | | |
|---|---|---|---|
| 4,744,663 | 5/1988 | Hamashima et al. | 356/375 |
| 4,984,884 | 1/1991 | Ryu et al. | 356/73.1 |
| 5,453,827 | 9/1995 | Lee | 356/73.1 |
| 5,546,483 | 8/1996 | Inoue et al. | 385/14 |
| 5,796,889 | 8/1998 | Xu et al. | 385/24 |

OTHER PUBLICATIONS

Mizrahi et al, "Optical Properties of Photosensitive Fiber Phase Gratings", Journal of Lightwave Technology, vol. 11, pp. 1513–1517, Oct. 1993.

Primary Examiner—Rodney Bovernick
Assistant Examiner—Ellen E. Kim

[57] ABSTRACT

An optical switch device that includes a primary optical port for receiving a first optical signal from testing equipment such as an optical time domain reflectometer. The optical switch device also includes a plurality of connector ports for connecting to external optical fibers. An optical switching mechanism is used to optically connect the primary optical port to a selected one of the connector ports. At least one secondary optical port is also provided for receiving at least one second optical signal from an alternate piece of testing equipment. A multiplexing element is disposed between the optical switching mechanism and the connector ports. The multiplexing element combines the first test signal and the at least one second test signal to produce a multiplexed signal. The multiplexed signal is propagated through the optical fibers being tested, thereby enabling multiple tests to be performed on the optical fiber at the same time.

14 Claims, 2 Drawing Sheets

PRIMARY STAGE OPTICAL SWITCH FOR AN OPTICAL FIBER ADMINISTRATION SYSTEM

BACKGROUND OF THE INVENTION

1. Field of the Invention

The present invention relates to optical switches used to connect optical fibers at a central office to a source of optical fiber test signals. More particularly, the present invention relates to an optical switch system that selectively directs optical test signals to optical fibers that are part of a fiber administration system.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are connection modules that receive the ends of all of the individual optical fibers that enter the central office and are contained within the optical fiber network. By terminating each optical fiber at a connection module on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

When an optical fiber cable is newly laid, repaired, sliced or otherwise altered, it is important to check the optical integrity in between the central office and each ONU. As a result, each time an optical fiber cable is altered, the integrity of the overall optical pathway must be tested. In many applications, an optical cable exiting the central office contains several different optical ribbons. Each of the ribbons contains a plurality of individual optical fibers. When an optical cable is spliced, the cable is cut open and each of the optical ribbons contained within that cable are spliced individually. As such, when one optical ribbon is spliced to another, several different individual optical fibers are being spliced during that operation. If any one of the optical fibers in the optical ribbon fails to splice properly, either that ribbon or the entire optical cable must be cut and re-spliced. After all of the splices have been made between the central office and an ONU, the overall optical path is tested.

In these tests, testing equipment is connected to the optical fibers in the pathway both at the central office and at the remote location. Typically a first test signal is sent from the central office to the remote location. A second test signal is then generated at the remote location and sent to the central office. Through analysis of both test signals the integrity and transmission characteristics of the optical pathway can be quantified.

Often when testing an optical pathway, different tests need to be performed. These tests may be performed by different pieces of test equipment. Else, such tests may be performed by utilizing different test signals from the same piece of testing equipment. At both the central office and the remote location there is only one terminated connector that leads to each of the optical fibers in the optical pathway. As a result, only one piece of testing equipment can be connected to each end of an optical fiber at any one time. Accordingly, only one test signal can be introduced into each optical fiber at either end. To change the test signal, the test equipment must be changed or reset. The secondary tests must then be performed after the primary tests. This adds significantly to the overall time and labor needed to complete a full series of tests on an optical pathway.

A need therefore exists in the art for an optical switch assembly that can be coupled to a plurality of different pieces of test equipment and can run tests from the different pieces of testing equipment simultaneously.

SUMMARY OF THE INVENTION

The present invention is an optical switch device. The optical switch device includes a primary optical port for receiving a first optical signal from testing equipment such as an optical time domain reflectometer. The optical switch device also includes a plurality of connector ports for connecting to external optical fibers. An optical switching mechanism is used to optically connect the primary optical port to a selected one of the connector ports. At least one secondary optical port is also provided for receiving at least one second optical signal from an alternate piece of testing equipment. A multiplexing element is disposed between the optical switching mechanism and the connector ports. The multiplexing element combines the first test signal and the at least one second test signal to produce a multiplexed signal. The multiplexed signal is propagated through the optical fibers being tested, thereby enabling multiple tests to be performed on the optical fiber at the same time.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
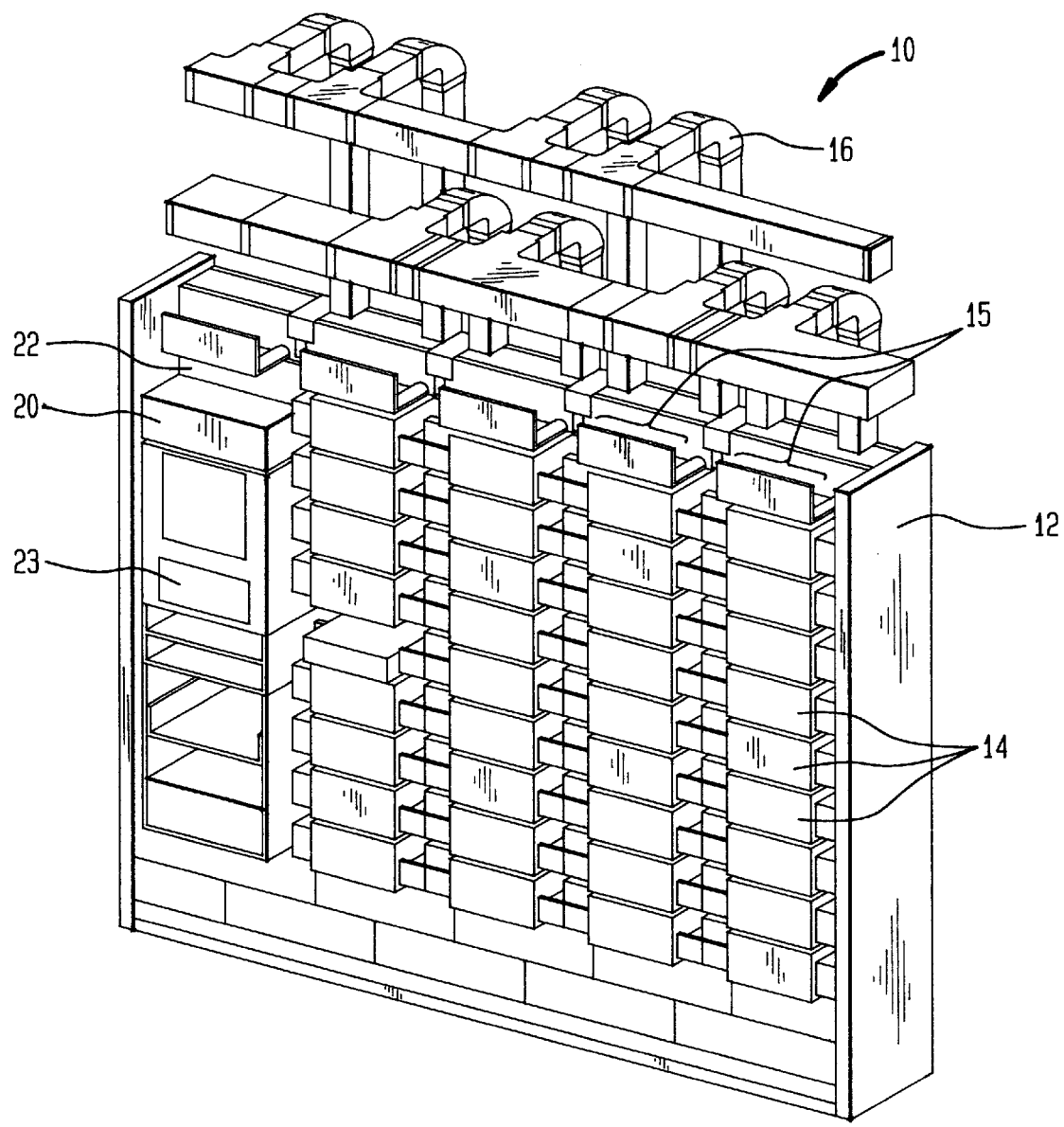
FIG. 1 is a perspective view of an optical fiber administration system containing a first plurality of bays and a second plurality of fiber distribution shelves in each bay.

In FIG. 1, a fiber administration system 10 is shown. Such administration systems are exemplified by the disclosures of U.S. patent application Ser. No. 08/645,108, entitled AN OPTICAL COMMUNICATIONS SYSTEM HAVING DISTRIBUTED INTELLIGENCE, filed May 13, 1996, is now U.S. Pat. No. 5,712,942, and U.S. patent application Ser. No.

08/709,978, entitled FIBER OPTIC OPERATION CENTER, filed Sep. 9, 1996, is now patented as U.S. Pat. No. 5,689,604. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of the three standard sizes, having a five inch height, a seven inch height or a nine inch height. A network of conduits 16 lead the various optical fibers from the optical fiber network to the fiber distribution shelves 14.

Contained within the framework of the optical fiber administration system 10 is an optical time domain reflectometer (OTDR) 20 that is used in the testing of the various optical fibers that are part of the fiber administration system 10. Also contained in the framework of the optical fiber administration system 10 can be alternate testing equipment 23 such as power meters, specialized laser sources, and other well known forms of test equipment used in conjunction with fiber optic networks, such as, for example, that used with SONET (synchronous optical networks) and the like. The OTDR 20 is coupled to a primary stage optical switch 22. The alternate test equipment 23, also referred to as secondary testing devices, is also directly connected to the primary stage optical switch 22 in a manner which will later be described. As such, no labor is involved in detaching the OTDR 20 and reattaching the alternate test equipment 23 for different tests, as is required in many prior art systems.

Figure 2:
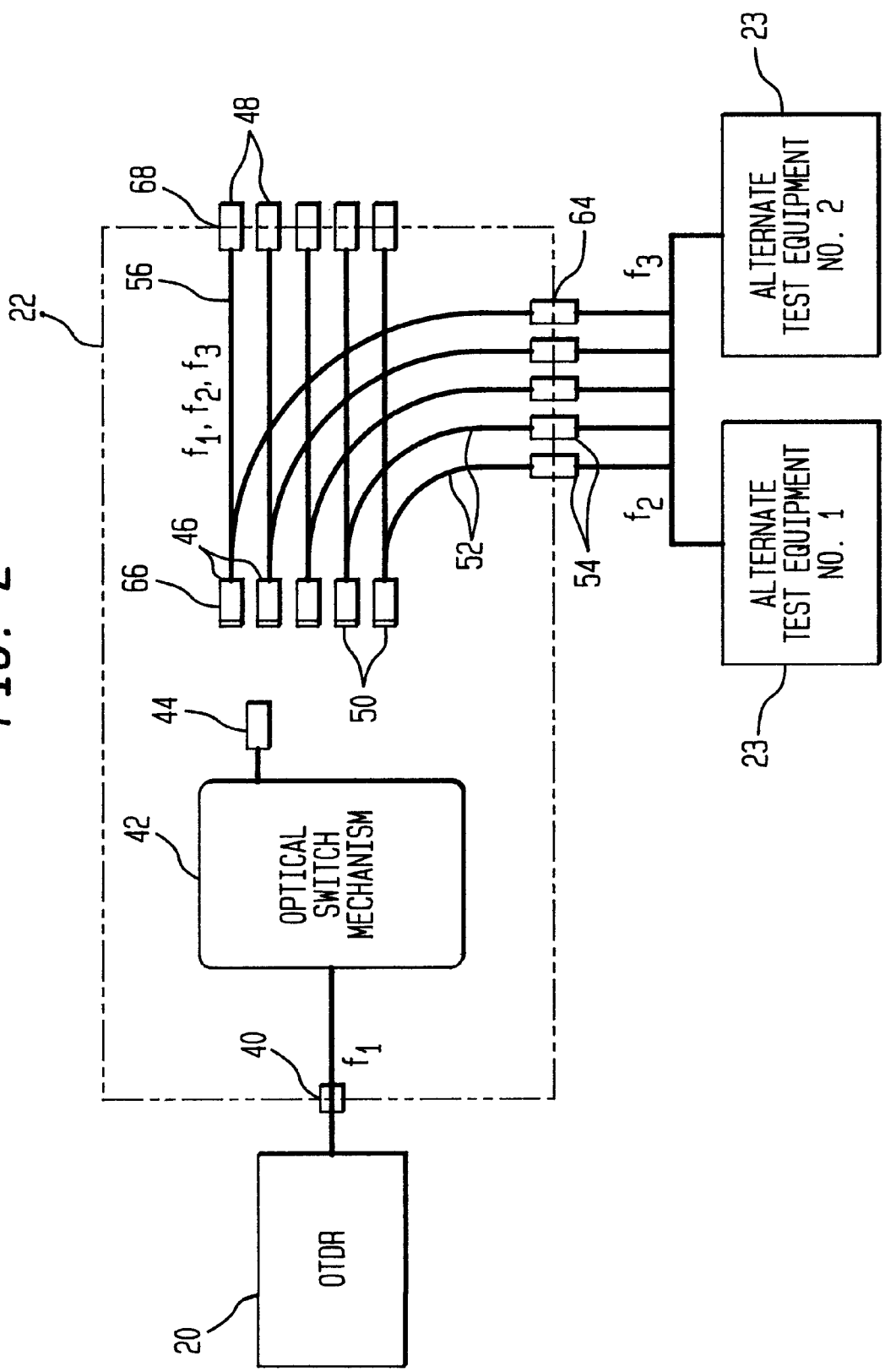
FIG. 2 is a schematic diagram of a primary optical switch in accordance with the present invention.

Referring to FIG. 2, a schematic of a primary optical switch 22 is shown in accordance with the present invention. Unlike prior art optical switches, the optical switch 22 contains multiple input ports (40,54). The primary input port 40 is connected to the OTDR 20 as is done in the prior art. The primary input port 40 leads to an optical switching mechanism 42. The optical switching mechanism 42 moves a primary optical element 44 across an array of secondary optical elements 46, thereby selectively creating optical connections between the primary optical element 44 and the secondary optical elements 46. The working of such switching mechanisms are well known in the art and are available from a variety of manufacturers including JDS Fitel of Nepean, Ontario, Canada. As such, the workings of such a switching mechanism need not be set forth in detail.

The secondary optical elements 46 extend to connector ports 48. The connector ports 48 couple to various optical fibers in an optical pathway via the fiber administration system 10 (FIG. 1). A novel aspect of the shown primary optical switch 22 is the secondary optical elements 46 that lead to the connector ports 48. The structure of the secondary optical elements 46 includes a wave division multiplexer (WDM) low pass filter 50. Furthermore, secondary leads 52 also extend from the secondary optical elements 46. The secondary leads 52 terminate at an array of test ports 54 also referred to herein as secondary optical ports. The test ports 54 receive optical connections from alternate testing equipment 23 contained within the fiber administration system.

In operation, the OTDR 20 emits testing signals in a first frequency range f1. The alternate test equipment 23 is connected, as desired, to the various test ports 54. Each piece of the alternate test equipment 23 is set to operate at a specific frequency range that is different from that of the OTDR 20 and the other pieces of alternate test equipment. In the shown example of FIG. 2, the OTDR 20 is set to operate at the frequencies around f1. The signals from the OTDR 20 are propagated from the primary optical element 44 into a targeted secondary optical element 66 of secondary optical elements 46 in the traditional manner. As such, any optical fiber connected to a corresponding targeted connector port 68 of the primary stage optical switch 22 will receive the signals generated by the OTDR 20.

While the OTDR 20 is in operation, the alternate test equipment 23 can also be in operation. For example, if pieces of test equipment 23 that generate test signals at the frequencies f2 and f3 were attached to a first test port 64, as is shown, those test signals would also be received by the targeted secondary optical element 66 of the first connector port 68. The secondary optical element 66 of the first connector port 68 therefore is receiving the f1 signals from the OTDR 20 and both the f2 and f3 signals from the alternate test equipment 23. Within the structure of the targeted secondary optical element 66 all the signals (f1, f2, f3) enter the WDM low pass filter 50, wherein the WDM low pass filter 50 combines all the received frequencies f1, f2, f3 into a multiplexed signal. The multiplexed signal is then directed to the connector port 68 along the main output lead 56 of the secondary optical element. The connector port 68 of the optical 22 switch therefore is supplied with a multiplexed signal that contains signals from both the OTDR 20 and the alternate test equipment 23. The multiplexed signal can be forwarded to any of the optical fibers that connect to the fiber administration system, via the connector ports, whereby multiple testing of those fibers can be performed simultaneously.

The simultaneous testing of optical fibers in the fiber administration system greatly reduces testing time as compared to prior art testing procedures that performed one test at a time. Furthermore, the labor involved in removing one piece of test equipment and adding another is eliminated from the testing procedure protocols.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. An optical switch device, comprising:
   a primary optical port for receiving a first optical signal;
   plurality of connector ports;
   an optical switching mechanism for optically connecting said primary optical port to a selected one of said connector ports;
   at least one secondary optical port that receives at least one second optical signal;
   a plurality of multiplexing elements optically coupled to said connector ports, wherein each of said connector ports has its own multiplexing element associated therewith, said multiplexing elements multiplexing said first optical signal and said at least one second optical signal received by each of said connector ports to produce a multiplexed signal.

2. The device according to claim 1, wherein said multiplexing elements include a wave division multiplexing low pass filter.

3. The device according to claim 1, wherein each of said connector ports is optically coupled to an optical element that exchanges optical signals with said first port via said optical switch mechanism.

4. The device according to claim 3, wherein said each of multiplexing element is contained within each said optical element.

5. The device according to claim 1, assembly according to claim 1, wherein each said optical switch is optically coupled to said at least one second optical port.

6. The device of claim 1, wherein said first optical signal is from a first piece of test equipment and said second optical signal is from a second piece of test equipment.

7. In an optical system having a plurality of optical fibers, an optical time domain reflectometer and a plurality of secondary optical testing devices used to test said optical fibers, an optical switch device for interconnecting said optical fibers to said optical time domain reflectometer and said secondary testing devices comprising:

a first optical port for receiving a first optical signal from said optical time domain reflectometer;

a plurality of optical connector pons for optically connecting with said optical fibers;

a switch for selectively optically connecting said first optical port to a targeted one of said optical connector ports;

a plurality of multiplexing, elements disposed between said switch and said optical connector ports, wherein each of said multiplexing elements are connected to a different one of the secondary testing devices and each of said multiplexing elements multiplexes said first signal from said optical lime domain reflectometer with a signal from the secondary testing device to which that multiplexing element is connected.

8. The device according to claim 7, wherein said multiplexing elements include a wave division multiplexing low pass filter.

9. The device according to claim 7, wherein each of said connector ports is optically coupled to an optical element that exchanges optical signals with said first optical port via said switch.

10. The device according to claim 9, wherein said each of multiplexing element is contained within each said optical element.

11. In an optical system having a plurality of optical fibers, an optical time domain reflectometer and a plurality of secondary optical testing devices, a method of simultaneously testing said optical fibers with said optical time domain reflectometer and said secondary optical testing devices comprising the steps of:

generating a first test signal in a first frequency range using said optical time domain reflectometer;

selectively coupling said first test signal to at least one targeted optical fiber using an optical switch;

generating at least one second test signal in at least one second frequency range using said secondary optical testing devices;

providing a plurality of multiplexing elements, wherein a different one of said multiplexing elements is positioned between said optical switch and each of said secondary optical testing devices; and combining said at least one second test signal with said first test signal with said multiplexing elements.

12. The method according to claim 11, wherein said step of combining includes multiplexing said first test signal and said at least one second test signal.

13. The method according to claim 11, wherein said step of combining includes passing said first test signal and said at least one second test signal through a wave division multiplexing low pass filter.

14. The method according to claim 11, wherein said optical switch contains a primary optical element that selectively aligns with secondary optical elements and said step of combining includes multiplexing said first test signal and said at least one second test signal at said secondary optical elements.

* * * * *